US007061973B1

(12) United States Patent
Mehrabanzad et al.

(10) Patent No.: US 7,061,973 B1
(45) Date of Patent: Jun. 13, 2006

(54) DATA MODE SIGNALING SYSTEM FOR PCM MODEM ADAPTATION

(75) Inventors: Sepehr Mehrabanzad, Southborough, MA (US); Dae-Young Kim, Lexington, MA (US); John Pilozzi, Stow, MA (US)

(73) Assignee: General Electric Capital Corporation, Norwalk, CT (US)

( * ) Notice: Subject to any disclaimer, the term of this patent is extended or adjusted under 35 U.S.C. 154(b) by 0 days.

(21) Appl. No.: 09/497,328

(22) Filed: Feb. 3, 2000

(51) Int. Cl.
*H04B 1/38* (2006.01)
*H04L 5/16* (2006.01)

(52) U.S. Cl. ........................... 375/222; 375/224
(58) Field of Classification Search ............... 375/219, 375/220, 221, 222, 224, 225; 370/252
See application file for complete search history.

(56) References Cited

U.S. PATENT DOCUMENTS

| 4,751,510 | A | | 6/1988 | de Saint Michel et al. ...... 340/825.07 |
| 4,780,883 | A | * | 10/1988 | O'Connor et al. .......... 375/219 |
| 5,008,903 | A | * | 4/1991 | Betts et al. .................. 375/221 |
| 5,265,151 | A | | 11/1993 | Goldstein |
| 5,483,530 | A | | 1/1996 | Davis et al. ................... 370/79 |
| 5,493,609 | A | | 2/1996 | Winseck, Jr. et al. ......... 379/96 |
| 5,617,423 | A | * | 4/1997 | Li et al. ...................... 370/426 |
| 5,864,560 | A | * | 1/1999 | Li et al. ...................... 370/465 |
| 6,263,016 | B1 | * | 7/2001 | Bellenger et al. ........... 375/222 |
| 6,421,375 | B1 | * | 7/2002 | Chu et al. .................... 375/222 |

OTHER PUBLICATIONS

PCT International Search Report, PCT/US01/03413, filed Feb. 1, 2001 (3 pgs.).
Ayanoglu, "An Equalizer Design Technique for the PCM Modem: A New Modem for the Digital Public Switched Network," IEEE Transactions of Communications, vol. 46 No. 6 Jun. 1998, pp. 763-774.
Supplementary European Search Report (EP01905357).

* cited by examiner

*Primary Examiner*—Jean B Corrielus

(57) ABSTRACT

In a full duplex PCM modem system having an analog and digital modem, a method and apparatus is provided for on-the-fly reconfiguring of analog or digital modem transmitter parameters without switching back to a retrain or startup mode. In one embodiment, the transmitter parameters for the analog modem are modified to take into account channel impairments, in which modified precompensation parameters are sent from the digital modem to the analog modem without switching out of the data mode. In another embodiment, transmit power levels sensed at the analog modem which are non-optimal are adjusted by new parameters sent from the digital modem without having to switch back to the startup mode. In a further embodiment, transmitter parameters in the digital modem are reconfigured to provide more an increased downstream data rate from the digital modem upon sensing improvement in the quality of the downstream channel without switching to the startup mode.

8 Claims, 2 Drawing Sheets

DATA MODE SIGNALING SYSTEM FOR PCM MODEM ADAPTATION

FIELD OF INVENTION

This invention relates to the field of telecommunications and more particularly to a method and apparatus to provide on the-fly-adaptation or correction to the modems utilized in a PCM modem system, in which data mode signaling is utilized.

BACKGROUND OF THE INVENTION

As is described in the U.S. patent application Ser. No. 09/390,106 entitled Method and Apparatus for a Start-Up Procedure for Digital and Analog Modems Utilizing Pulse Code Modulation for Data Transmission, filed Sep. 3, 1999, assigned to the assignee hereof and incorporated herein by reference, a startup procedure is described which details a startup sequence between digital and analog PCM modems. For both the analog and the digital modems, the receiver structures are capable of measuring channel impairments given that there is a reference training sequence transmitted by each transmitter. At the end of the startup sequence each receiver has enough information to know exactly what the channel impairments are in either direction.

Given that each receiver knows the impairments, they can subsequently design proper equalization or pre-equalization structures based on the application or the direction of the channel. For the digital modem in the upstream direction, the digital modem designs a set of parameters for the analog modem transmitter. These sets of parameters include the transmit constellation, mapping, and pre-equalizer parameters. The pre-equalizer structure itself is combined from pre-filter and pre-coder filter coefficients. All of these parameters are calculated based on the measurements by the digital modem receiver during the startup sequence and then passed through to the analog modem to be used during the data mode. The initial startup sequence enables the digital modem to properly measure the upstream channel and then design the parameters that are then transmitted to the analog modem and used in data mode.

As described in U.S. patent application Ser. No. 09/390,106 entitled Method and Apparatus for a Start-Up Procedure for Digital and Analog Modems Utilizing Pulse Code Modulation for Data Transmission, procedures are defined in which the digital modem updates all these parameters via a rate re-negotiation scheme in which parameter updates are transmitted to the analog modem only after exiting the data mode and reentering the startup mode. This requires switchover to the startup structure, resulting in an extra time penalty and a lower transfer rate in both directions. Also, different transmitter (analog modem) and receiver (digital modem) structures must be used in the upstream direction since Pulse Amplitude Modulation is utilized during the startup and PCM modulation is utilized during the data mode.

The distinction between the startup mode and the data mode is that during the startup mode data is transmitted in the upstream direction through the utilization of pulse amplitude modulation or PAM. In contradistinction, in the data mode data is transmitted in both directions via PCM modulation. In general transfer rates in data mode are much higher than transfer rates in the startup mode.

To summarize, when, after startup, transmitter parameters needed to be modified, the startup mode is again invoked which involves the use of the pulse amplitude modulation.

It will be appreciated, that once having entered into the data mode, switching from the data mode to the startup mode is a time consuming because of the complete structure change for the analog modem transmitter and the digital modem receiver between PCM modulation and PAM.

In a typical situation, switching from the data mode to the startup mode can take as long as two to seven seconds, an inordinately long time to simply readjust the transmit parameters in the modems. This significantly underutilizes the bandwidth during the switchover time, thus lowering throughput.

SUMMARY OF THE INVENTION

Rather then switching from the data mode to the startup mode every time that either analog or digital transmitter parameters are to be changed, in the subject invention parameter changes are transmitted to the appropriate modem while still in the data mode. For instance if channel variations or impairments are sensed, in the subject method this results in the generation of redesigned parameters which are transmitted to the other side over the higher speed data mode structure, thereby both eliminating the time required to switch from one mode to the other and enabling the system to take advantage of the faster PCM modulation transmission rate.

By way of example, consider changes to the transmit structure of the analog modem. During startup, channel measurements are taken at the digital modem and a set of parameters is generated which are to be transmitted to the analog modem to pre-compensate the analog side. This information includes pre-equalization, transmit constellation, and the mapping parameters which are to be utilized by the analog modem's transmitter during the data mode.

Note that the transmit constellation defines the set of symbol values used in the modulation, whereas the mapping parameters are those which are used to map the input bit streams to symbols by the transmitter.

As a result of the parameters passing from the digital to the analog modem side, the transmit parameters at the analog side are modified, adapted, or altered based on sensed channel characteristics by the digital modem. Modification, adaptation, or alteration refers to for instance changes in pre-equalization filter coefficients, changes in the transmit constellation redefining the level or amplitude of each symbol, and changes in mapping parameters which determine the transmitter output power for the analog modem.

After startup, the mode is switched to the data transmission mode in which the higher rate PCM modulation scheme is utilized in both directions.

As mentioned hereinbefore, should channel impairment or changes be sensed, in this case at the digital side, it was the practice to switch out of the data transmission mode and into the startup mode to be able to modify or adapt the aforementioned parameters to accommodate the changes in the channel. This involved switching out of PCM modulation and into the pulse amplitude modulation mode associated with the startup procedure.

However in the subject system, once having entered the data transmission mode, in-band signaling is used to transmit changes to the particular modem on the fly. This is done using the PCM modulation scheme which is employed during the data mode. What is accomplished by the subject system is that no longer is it necessary to switch from the data transmission mode to the startup mode, a time consuming process. Moreover the information can be transmitted almost at twice the rate using PCM modulation. This results in significant bandwidth and other advantages.

As example of modification of the digital modem, one scenario exists where one wants to modify the digital modem TX parameters. Assume the analog modem detects that noise in the downstream line is reduced over that which existed during the initial startup. In this case the analog modem would want to request an increased downstream rate from the digital modem. This is accomplished by the analog modem requesting a new more dense constellation from the digital modem for the downstream data transmission. In the subject system, the analog modem initiates a fast parameter exchange utilizing the PCM modulation scheme associated with the data mode which instructs the digital modem to use a new constellation. This is done by sending upstream signals, not using PAM, but rather using PCM modulation, thus avoiding switching to the PAM.

As to analog modems, it is important to be able to modify the output transmit power at the analog modem to match the desired power level. The output transmit power of an analog modem is in general set during startup by the mapping parameters generated at the digital modem according to a power constraint indicated by the analog modem. However the mapping parameters may, on occasion, result in the analog modem having an output power either exceeding or below a predetermined desired level. Regardless of the way in which the mapping parameters from the digital modem are originally constructed, it is only at the analog side that the error in the power level can be measured. Thus it is only at the analog side that one can determine whether or not the output power is within the prescribed limits from a desired level and thus whether the parameters set at the digital side are correct. An out-of-limit condition can only be corrected by generating new mapping parameters from the digital modem after the out-of-limit condition is known. Rather than switching to the startup mode to alert the digital modem to the out-of limit condition at the analog modem, this signaling is now done using the faster PCM modulation and without switching to PAM.

Specifically, while the initial mapping parameters are set up in the startup mode, measurements taken at the analog modem determine whether or not the limits have been exceeded in either direction. Upon sensing of either over-power or under-power, this fact is transmitted to the digital modem, not by the PAM method of transmission, but in the PCM modulation mode. Upon receipt of the information from the analog modem that limits have been exceeded in either direction, the digital modem redesigns or reconstructs the mapping parameters and transmits these mapping parameters back to the analog modem via the PCM modulation scheme, such that the analog modem can be reconfigured to assure that its output is within the prescribed limits. In an alternative embodiment the analog modem may redesign or reconstruct the mapping parameters and then use the fast parameter exchange as defined here to pass the new mapping parameters to the digital modem such that the digital modem may correctly decode and demap the received symbols into output bit streams. It will be appreciated that this parameter transfer can be done much faster using the PCM modulation instead of PAM as explained earlier.

Note, the utilization of the data transmission mode to provide adaptation of the modems is critical in reducing the time necessary to transmit this information in both directions. In one embodiment, the information transmission may be double the rate as compared with systems which must both switch between the startup mode and the data mode and PAM.

In summary, in a full duplex PCM modem system having an analog and digital modem, a method and apparatus is provided for on-the-fly reconfiguring of analog or digital modem transmitter parameters without switching back to a retrain or startup mode. Note, that after startup, all data transfer is done at the higher rate associated with the data mode. As will be seen, the subject system in one embodiment garners a ten to one improvement over systems which must switch back to the startup mode. In one embodiment, the transmitter parameters for the analog modem are modified to take into account channel impairments, in which modified precompensation parameters are sent from the digital modem to the analog modem without switching out of the data mode. In another embodiment, out-of-limit output power levels sensed at the analog modem are adjusted by new parameters sent from the digital modem without having to switch back to the startup mode. In a further embodiment, transmitter parameters in the digital modem are reconfigured to provide more an increased downstream data rate from the digital modem upon sensing improvement in the quality of the downstream channel without switching to the startup mode. Also, upon sensing a decrease in performance, i.e. an increase in the error rate by the analog modem, the transmitter parameters in the digital modem are reconfigured to provide a decrease in the data rate by expanding the constellation, i.e. increasing the minimum distance between the constellation points. It will be appreciated that the ability to modify the constellation points enables the analog modem to alter the digital modem transmit power level as desired.

BRIEF DESCRIPTION OF THE DRAWINGS

These and other features of the subject invention will be better understood in connection with the Detailed Description in conjunction with the Drawings; of which.

DETAILED DESCRIPTION

Figure 1:
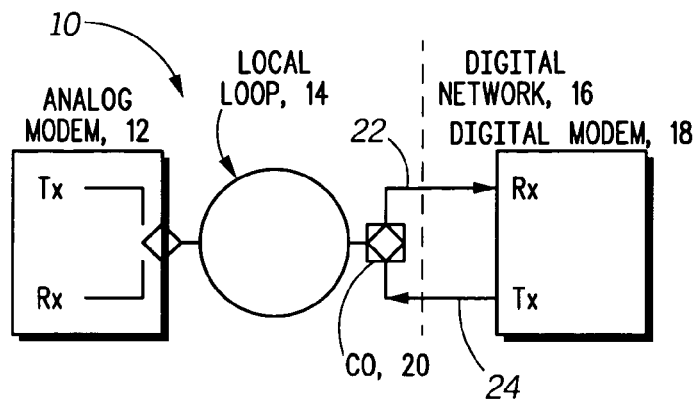
FIG. 1 is a block diagram of the utilization of an analog modem and a digital modem in a PCM modem system.

Referring now to FIG. 1, a PCM modem communication system 10 is illustrated in which an analog modem 12 is connected via an analog local loop 14 to a digital network 16 and then to a digital modem 18 through the utilization of the telephone company central office, CO 20, which is utilized to connect the local loop to the digital network.

As illustrated, both the analog modem and the digital modem have transmitter and receiver sections labeled $T_x$ and $R_x$, respectively.

It will be appreciated that CO 20 includes, but is not limited to, an analog-to-digital converter and a digital-to-analog converter, with the flow of information being illustrated by respective arrows 22 and 24 to and from the digital modem. Note that ITU-T recommendation G.711 defines characteristics and operational procedures for the analog-to-digital converter and the digital-to-analog converter.

For this system, data may be transmitted both in the downstream direction from the digital modem to the analog modem and in the upstream direction from the analog modem to the digital modem utilizing PCM modulation.

This type of bi-directional PCM communication system is described in U.S. patent application Ser. No. 08/724,491, entitled Hybrid Digital/Analog Communication Device, assigned to the assignee hereof and incorporated herein by reference.

Startup

In the system described herein, the analog modem, rather than transmitting only in the PCM modulation mode, transmits in a pulse amplitude modulation mode during the startup procedure. The purpose of utilizing pulse amplitude modulation in the startup mode is to be able to characterize the communications channel in the simplest and most robust of manners by sending a limited number of analog levels to the digital modem. This permits the analog modem to be set appropriately to accommodate impairments in the communications channel based on measurements taken at the digital modem. The startup procedure is described in the above-mentioned U.S. patent application. It is the purpose of the startup procedure to measure the channel characteristics at the digital modem and to transmit parameters to the analog modem for configuring the transmitter structure of the analog modem.

In one embodiment, the startup procedure begins with the sending of a set of signals in the upstream direction over the communications channel to the digital modem via pulse amplitude modulation or PAM. It is this set of training signals which can be utilized to determine the characteristics of the upstream direction of the communications channel once received by digital modem.

The digital modem receives signals sent by the analog modem and based upon the received signals calculates the characteristics of the communications channel in the upstream direction. It will be noted that the signals the analog modem sends to the digital modem will likely be altered in such a way that the received signals will be different than the sent signals. For the calculation of the characteristics of the upstream direction of the communications channel, the characteristics of the received training signals are utilized. These channel characteristics typically include the upstream channel response, and digital and analog impairments.

For example, U.S. patent application Ser. No. 09/092,786 entitled Device and Method for Detecting PCM Upstream Digital Impairments in a Communications Network, assigned to the assignee hereof, and incorporated herein by reference, describes a method for detecting digital impairment by evaluating a PAM training sequence. Also, U.S. Pat. No. 5,887,027 entitled Methods of Upstream Channel Modeling for PCM Modem assigned to Lucent Technologies, Inc. and incorporated herein by reference describes how to detect analog impairments and determine the channel response during the startup.

In a preferred embodiment of the present invention the digital modem utilizes the characteristics calculated as described above to determine a parameter set for the analog modem. The parameter set as determined by the digital modem is subsequently sent to the analog modem in the downstream direction of the utilizing PAM modulation.

The parameters from the digital modem include setting a pre-equalizer, a transmit constellation, and a transmit mapping structure so as to optimize the output of the analog modem, given the measured channel impairment or characteristics. The pre-equalization structure usually includes but is not limited to pre-filter and pre-encoder coefficients as described in U.S. patent application Ser. No. 08/999,249 entitled Device and Method for Pre-Coding Data Signals for PCM Transmission, assigned to the assignee hereof and incorporated herein by reference. Constellation sets can be defined as described in U.S. patent application Ser. No. 08/999,254 entitled Method for PCM Upstream Transmission Utilizing an Optimized Transmit Constellation, assigned to the assignee hereof and incorporated herein by reference. Mapping parameters can be defined as described in U.S. patent application Ser. No. 09/234,451 entitled Method and Apparatus for Combining a Trellis Coding Scheme with a Pre-Coding Scheme for Data Signals, assigned to the assignee hereof and incorporated herein by reference and is described in ITU Recommendation V.90 and V.92.

Channel Impairment after Startup

As will be appreciated, the analog modem utilizes the parameter set generated by the digital modem during the startup procedure in order to set up or bring on-line its precompensation circuits to commence reliable data transmission.

What will be appreciated in terms of the system illustrated in FIG. 1 and the above noted description is that once the startup sequence has been completed, channel changes occur which can impair the communications channel to the point that reliable communications cannot be maintained between the analog modem and the digital modem.

Figure 2:
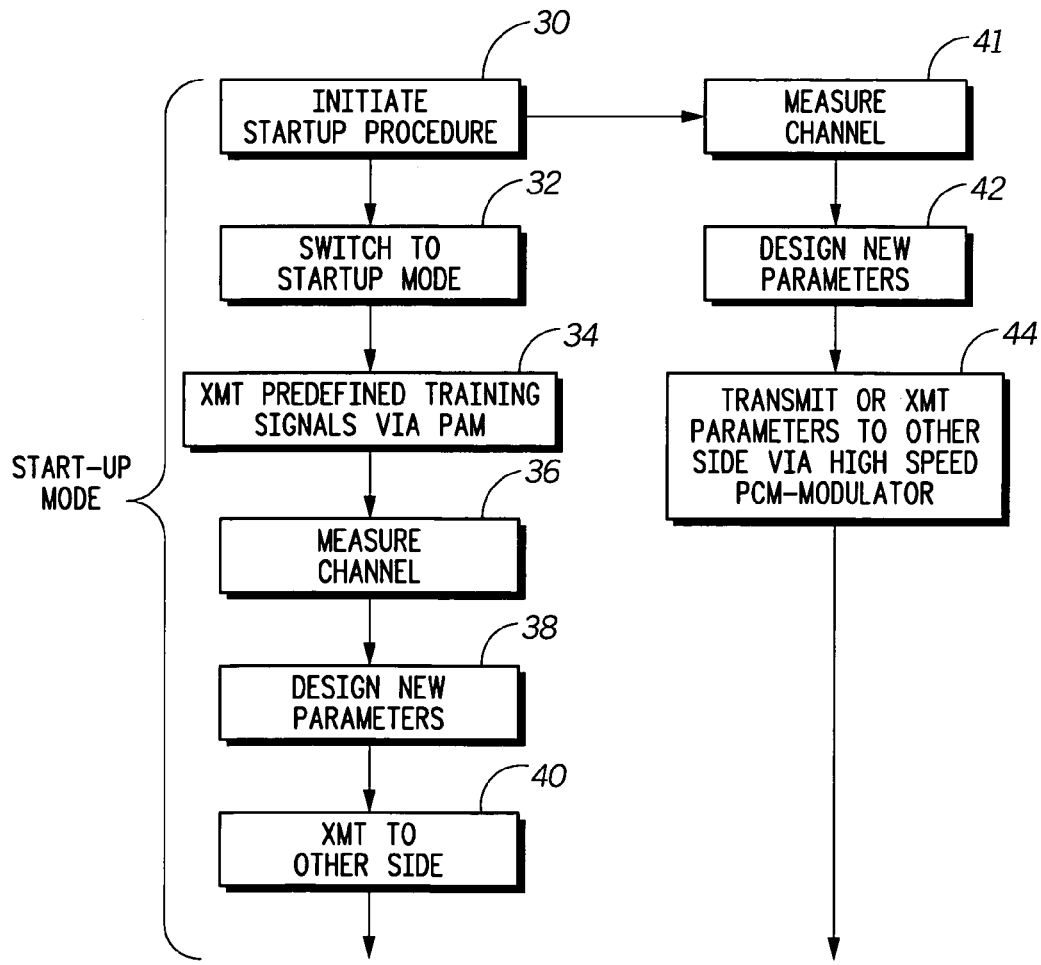
FIG. 2 is a flow chart, in the upstream direction, illustrating the switching of the analog modem to a start-up mode for changing precompensation circuits within the analog modem based on sensed channel impairments, also showing in another branch of the diagram the avoiding of the switch to the start-up mode utilizing the subject invention.

Referring to FIG. 2, at the beginning of the startup mode the digital modem initiates the startup procedure at 30 and instructs analog modem 12 to switch to the start-up mode, here illustrated at 32. The analog modem then transmits a predefined training sequence of signals via Pulse Amplitude Modulation as illustrated at 34, with these signals being utilized to measure channel variations as illustrated at 36.

Thereafter, digital modem 18 designs new parameters to be transmitted back to the analog modem as illustrated at 38 and transmits these parameters as illustrated at 40 back to the analog modem, in this case utilizing PCM modulation techniques.

It will be appreciated that in the startup mode the transmit section of the analog modem has its structure pre-configured to send data via PAM. PAM is utilized in the upstream direction between the analog modem and the digital modem in order to provide a training signal to permit the digital modem to be able to measure the channel. Note, in the startup mode and indeed in the data mode, all communications from the digital modem to the analog modem are done via PCM modulation. However, the rates during the startup are much lower than the rates during the data mode. ITU-T Recommendation V.90 defines the range for the startup from 12 kbits/sec to 40 kbits/sec, where the range for the data mode is from 28 kbits/sec to 56 kbits/sec. Typically, the rates used in startup are in the range of 16 to 32 kbits/sec.

Thereafter, and once having entered into the data mode, updating the analog modem to accommodate variations in the communications channel required switching back to the startup mode to change the precompensation elements in the analog modem. This was a time consuming process, in part because the startup mode is at least half as slow as the data mode.

While as described in FIG. 1, during the startup mode pulse amplitude modulation is used in the subject invention, after startup, the analog modem is switched to providing the transmitted data in the higher speed PCM modulation mode.

While, in the aforementioned system, PCM modulation in the upstream direction was disabled when channel impairment was sensed and the analog modem was switched to the start-up mode which required a complete reconfiguring of its transmit structure, in the subject invention, during the data mode if channel impairment is sensed as indicated at 41, as by the below-described technique, or if any of the precompensation elements need to be changed, the digital modem designs new parameters as illustrated at 42. After the parameters are redesigned, the digital modem transmits the new parameters to the analog modem as illustrated at 44 at the higher speed associated with PCM modulation.

No longer is it required that the analog modem's transmit section be restructured to transmit the training sequence, much less doing so using PAM. Rather the PCM modulation in the upstream direction is allowed to continue, with the new parameters transmitted to the analog modem utilized to reconfigure the precompensation elements in the analog modem on the fly.

It will be appreciated that the digital modem detects channel impairment in the data mode, not by virtue of the initial training sequence, but by virtue of channel monitoring while in the data mode. This technique, described below enables on-the-fly measurement of the channel without having to revert back to the pulse amplitude modulation training sequence utilized during startup.

Sensing Channel Changes

When the communications channel changes over time while in the data mode it is important to be able to sense channel changes or impairments. How this can be accomplished is as follows:

The following method takes advantage of the fact that the pre-equalization structure derived in the startup procedure is static. Hence, the error that is measured at the digital side is an indication of the channel variation that the pre-equalization structure is unable to track.

In one embodiment, the digital modem designs the pre-equalization structure and sends the parameters to the analog modem during the startup procedure. Also, it detects the upstream digital impairments and initializes its virtual inverse quantizer table. The pre-equalization structure is fixed when the modems enter the data mode. In the data mode, the only adaptive loop in the digital modem receiver is the echo canceller, which uses the decision error for its adaptation.

The source for the echo is the hybrid in the central office and is independent of the analog channel characteristics. The echo path characteristics are measured during the half duplex training portion of the startup procedure. The model is accurate enough to cancel 100% of echo's linear components with residual that contains all the non-linear effects.

Therefore, during the data mode, the decision error is due to analog channel variation that the pre-equalization structure can not track and any non-canceled echo components plus channel noise. Given, the echo path variation is much slower given that it is located in the CO equipment, the major component of error variation is caused by the analog channel variation.

Hence, a method to update the pre-equalization structure is for the digital modem to track the analog channel variation and determine when it has diverged from its initial channel estimate. At such instant, the digital modem will recalculate the pre-equalization structure based on the new channel. The new pre-equalizer structure is then passed to the analog modem using the data mode.

Transmit Parameter Reconfiguring

Figure 3:
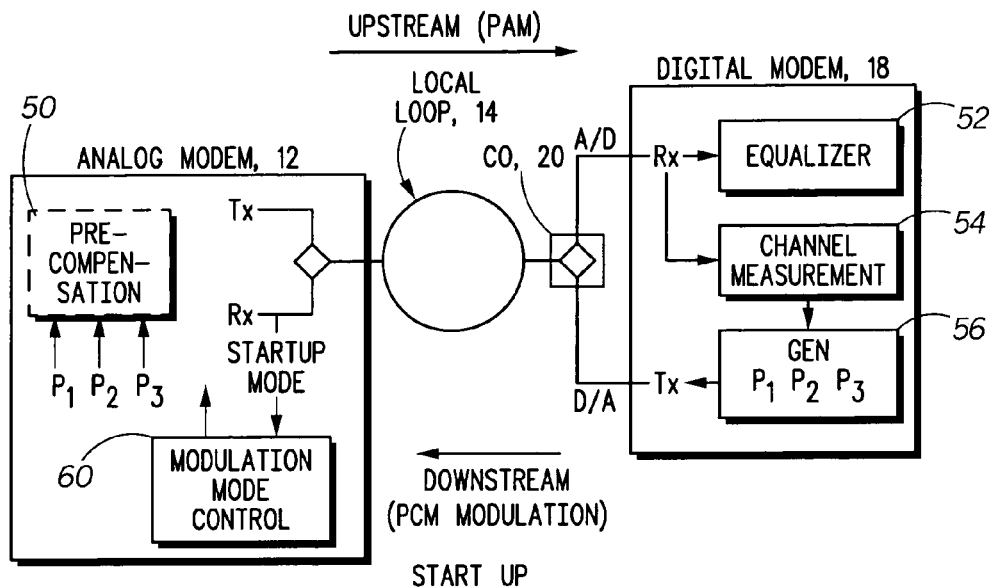
FIG. 3 is a block diagram illustrating a PCM modem communication system in which during a start-up mode, training information is transmitted from the analog modem to the digital modem utilizing pulse amplitude modulation, with the digital modem to analog modem handshake in the downstream direction being accomplished through the utilization of PCM modulation; and, FIG. 4 is a block diagram of the PCM modem communication system of FIG. 3 when the system is in the data mode, illustrating both upstream and downstream communication utilizing PCM modulation, with channel impairments being measured in each direction by the corresponding receiver, and with measurements at either modem enabling the generation of updated parameters for the use by the other modem transmitter which are transmitted to the other modem utilizing PCM modulation.

Referring now to FIG. 3, analog modem 12 has within the transmit section three elements, here indicated in dotted outline at 50. These elements are configured through the utilization of parameters P1, P2, and P3, respectively the preequalizer coefficients, transmit constellation, and transmit mapping parameters.

During start-up in the upstream direction PAM is utilized to transmit the training sequence to digital modem 18, with the training sequence being converted from analog to digital form and coupled to an equalizer 52 which is trained to initially detect the training sequence. Thereafter the channel is measured as illustrated at 54 directly from the receive line and parameters P1, P2 and P3 are generated at 56. Subsequently, P1, P2 and P3 are transmitted back over the communications channel in the downstream direction utilizing PCM modulation techniques as defined in ITU-T Recommendations V.90 and V.92. These parameters are then utilized by the precompensation elements 50 to optimize the analog modem transmit parameters for robust communication over the communications channel.

The modulation mode of the analog modem, either PAM or PCM modulation, is controlled via a modulation control unit 60, which upon initialization as detected at analog modem 12 configures the analog modem for transmitting the training sequence in the PAM format.

Figure 4:
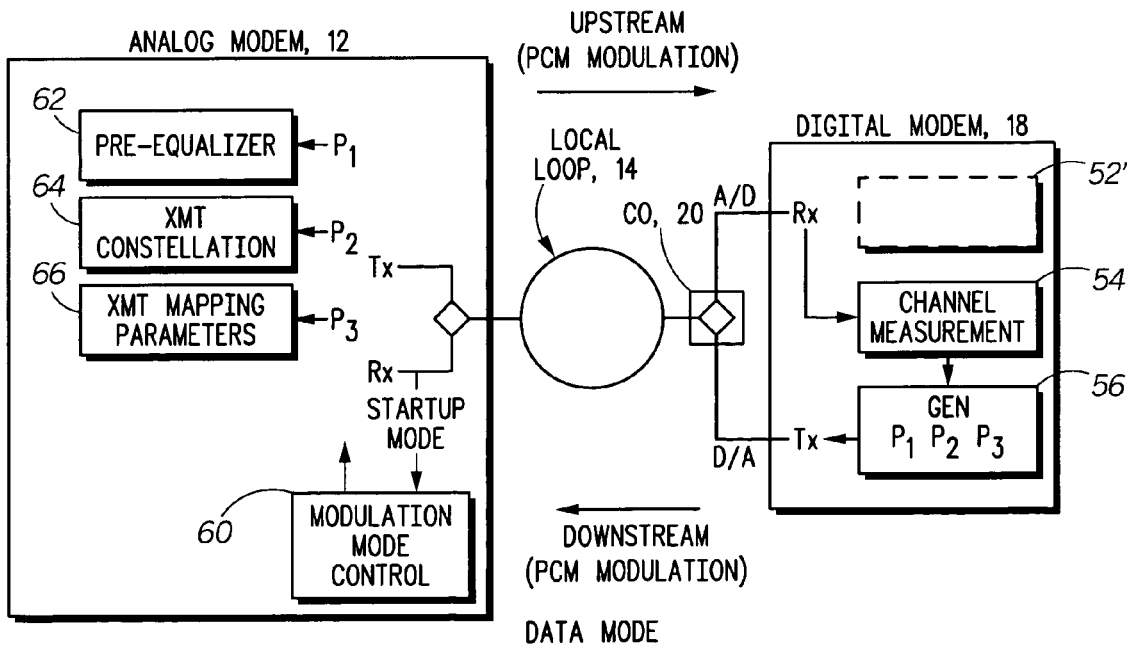

Thereafter and as illustrated in FIG. 4, in the data mode, channel measurement unit 54 continually monitors the quality of the communications channel and upon detection of impairments generates a new set of parameters P1, P2, and P3 at 56 which are transmitted downstream in the PCM modulation mode. The existence of new parameters are tagged and are detected at the receive section of the analog modem such that a pre-equalizer 62, a transmit constellation structure 64 and a transmit mapping parameter element 66 are immediately reconfigured to optimize the transmit parameters to accommodate the measured changes in the channel.

Pre-equalizer filter coefficients, transmit constellation, or transmit mapping parameters may be changed at this point in time. Moreover the output power of the analog modem can be changed via the transmit mapping parameters to keep the analog modem output in limit but at its maximum to establish robust communication.

It will be appreciated that in the data mode, modulation mode control unit 60 places the transmit section of the analog modem in the PCM modulation mode where it stays regardless of channel impairments sensed at the digital modem.

In this manner it is not necessary to switch the analog modem to its PAM mode in order to optimize the analog modem either for changes in the communications channel or for any other changes. Rather, changes to analog modem transmitter elements are made on the fly during the data mode, thereby maximizing bandwidth utilization and eliminating delays associated with switching from the PAM mode to the PCM modulation.

It is a finding of the subject invention that the precompensation elements of the analog modem can be adequately reconfigured on-the-fly without reverting to the original pulse amplitude modulation scheme utilized to send the initial training signals from the analog modem to the digital modem. It is this recognition that permits modem adaptation via data communication at the higher speeds associated with PCM modulation without having to throttle down the rate at which information is transferred from the analog modem to this digital modem. Furthermore, it is a finding of the subject invention, that although PCM modulation is utilized in downstream direction from the digital modem to the analog modem in both the startup and the data mode, the rates at which the information can be transferred are lower in the startup mode. Also, it will be appreciated that utilizing the data mode configuration enables the analog modem to reconfigure the digital modem transmitter much faster and avoids the decrease in throughput occasioned by having to switch back to the startup configuration.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a PCM modem system having an analog and digital modem coupled together via a communications channel and in which training sequences are transmitted from the analog modem to the digital modem and from the digital modem to the analog modem during the startup mode, a method for reconfiguring either modem transmitter parameters during a data mode, comprising the steps of:
   detecting a predetermined modem system characteristic;
   generating new transmitter parameters as a result of the detection of the predetermined characteristic; and,
   transmitting the new transmitter parameters to a modem in the data mode without switching back to the startup mode.

2. The method of claim 1, wherein the predetermined modem system characteristic is a measured communications channel characteristic, wherein the communications channel is measured at one modem and wherein the new transmitter parameters are sent from the modem at which the channel is measured to the modem to which it is coupled.

3. The method of claim 2, wherein the communications channel is measured at the digital modem.

4. The method of claim 3, wherein the transmitter parameters include precompensation parameters, wherein the measurement taken at the digital modem measures channel impairment and wherein new transmitter precompensation parameters which are the result of measured channel impairment are transmitted to the analog modem to reconfigure the analog modem transmitter without switching out of the data mode.

5. The method of claim 2, wherein the communications channel is measured at the analog modem.

6. The method of claim 5, wherein the measurement taken at the analog modem measures downstream channel quality and wherein data which is the result of measuring an increase or decrease in the downstream channel quality is sent to the digital modem without switching out of the data mode for the reconfiguring of the transmit parameters of the digital modem.

7. The method of claim 5, wherein the new transmitter parameters include constellation parameters and wherein the new constellation parameters are derived from measuring the communications channel at the analog modem and are sent to digital modem by the analog modem without switching out of the data mode for the reconfiguring of the transmit parameters of the digital modem.

8. The method of claim 1, wherein the predetermined modem system characteristic is an out-of-limit transmit power level measured at the analog modem and wherein information relating to the out-of-limit transmit power level condition is sent without switching out of the data mode to the digital modem, the digital modem transmitting new parameters to the analog modem in the data mode in response to the information relating to the out-of-limit condition to permit the analog modem to adjust its output power level.

* * * * *